United States Patent
Thelen et al.

[15] 3,640,493
[45] Feb. 8, 1972

[54] BRACKET FOR MOUNTING APPARATUS

[72] Inventors: Charles O. Thelen, Roselle, N.J.; Hans J. Ziegler, Brooklyn, N.Y.

[73] Assignee: Western Electric Company, Incorporated, New York, N.Y.

[22] Filed: Apr. 29, 1970

[21] Appl. No.: 32,839

[52] U.S. Cl. .......................................................... 248/27
[51] Int. Cl. ........................................................ G12b 9/08
[58] Field of Search .................... 248/27, 56, 343, DIG. 6; 220/3.6

[56] References Cited

UNITED STATES PATENTS 2,966,325   12/1960   Parcucci ............................. 248/343
3,090,587   5/1963    Peterson ............................. 248/27

*Primary Examiner*—William H. Schultz
*Attorney*—W. M. Kain, R. P. Miller and Don P. Bush

[57] ABSTRACT

A bracket, which is adapted to be mounted in an opening formed in a wall, has a pair of tab members which are threadedly mounted on an associated pair of screws positioned in the bracket. The tab members are restrained for sliding motion relative to the bracket within a pair of slots formed in the bracket wherein each slot has a long edge and a short edge. As the screws are rotated in one direction, the tabs advance through the slots in a rearward direction. When each of the tabs clears the short edge of the associated slot, the tab is permitted to rotate 180° to position clamping surfaces associated therewith in opposed relation to a plurality of flanges rigidly attached to the bracket and spaced forwardly of the tab. When the tab is in this position, portions of the wall adjacent to the opening are positioned between each flange and the clamping surfaces of the associated tab. Upon rotating the screws in the opposite direction, the tabs advance through the associated slots in the forward direction to clamp the edge of the opening in the wall between the tabs and the flanges, thereby mounting the bracket in the opening.

3 Claims, 7 Drawing Figures

PATENTED FEB 8 1972 3,640,493

INVENTORS
C. O. THELEN
H. J. ZIEGLER

BY J. R. Moses

ATTORNEY

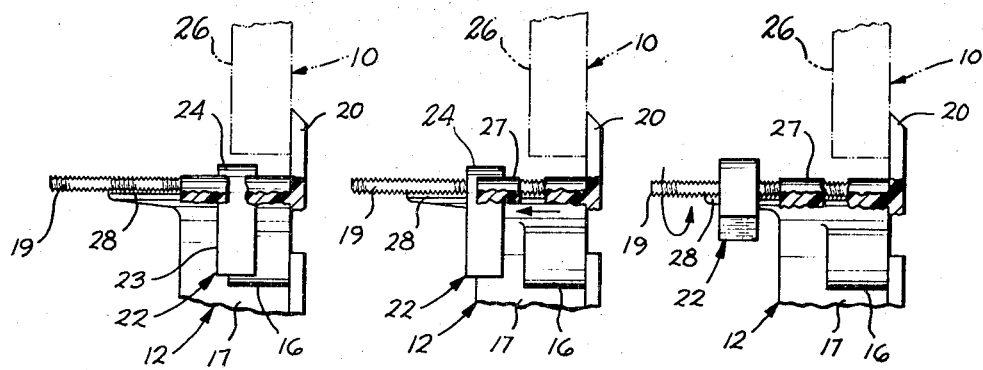
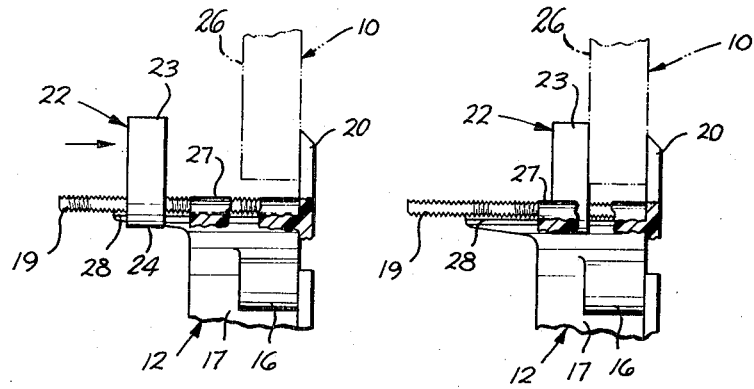

3,640,493

BRACKET FOR MOUNTING APPARATUS

BACKGROUND OF THE INVENTION

1. Field of the Invention

This invention relates to a bracket for mounting apparatus and more particularly to brackets which can be mounted on a surface such as a wall or a panel for supporting an article on the bracket.

2. Description of the Prior Art

When devices or articles are to be attached to surfaces such as a wall, it is general practice to cut an opening in the wall and to secure the device thereto by securing a flange portion of a bracket and one or more movable tabs of the bracket on opposite sides of a portion of the wall adjacent to the opening. For the sake of convenience, easy transport and packaging, the tabs are usually secured on the bracket prior to mounting the bracket. In many instances it has been necessary to remove the tabs and reposition them on the bracket before mounting the bracket in the wall opening. This usually necessitates holding the tab with one hand while simultaneously moving the tab into engagement with the wall with the other hand.

Since this is a time-consuming operation requiring a degree of dexterity, several mounting bracket designs have evolved wherein the tabs may be positioned and moved into engagement with he wall by using only one hand. However, these designs usually involve utilizing springs to position the tabs in place or using tabs with complex geometry which are relatively expensive and difficult to manufacture. Furthermore, in these prior art designs, the tabs generally project outwardly from the edge of the bracket necessitating a larger mounting hole in which to insert the bracket prior to clamping the bracket in place.

SUMMARY OF THE INVENTION

It is, therefore, an object of this invention to provide new and improved apparatus-mounting brackets to mounting articles and devices in place.

A further object of this invention is to provide new and improved apparatus-mounting brackets for mounting various types of articles and devices in openings through panels or walls.

Another object of this invention is to provide a new and improved apparatus-mounting bracket for supporting various articles and devices in place in panel or wall openings whereby the bracket may be secured by manipulating only one hand.

A bracket illustrating certain features of the invention may include a rim portion insertable into an opening in a wall and having a flange associated therewith for engaging an outside surface of the wall adjacent to the opening in which an article is mounted. The bracket further includes tab portions mounted on screws extending through slots in the rim portion for advancement into engagement with the inside surface of the wall adjacent to the opening to clamp and bracket to the wall and within the wall. Each slot has a long edge and a short edge and each tab has a projecting clamping surface. The tabs are initially oriented with the projecting clamping surfaces disposed radially inwardly within the confines of the rim of the bracket. Upon rotating the screws, the tabs move rearwardly through the slots. When the tabs clear the short edges of the slots, the direction of rotation of the screws is reversed whereupon the tabs pivot 180° until they engage the long edges of the slots and then advance forwardly through the slots and into engagement with the inside surface of the wall adjacent to the opening to clamp the edge portions of the wall opening between the tabs and the flanges.

BRIEF DESCRIPTION OF THE DRAWINGS

Other objects and features of the present invention will be more readily understood from the following detailed description of specific embodiments thereof when read in conjunction wit the appended drawings, in which:

FIG. 3 is a partial side view of the bracket of FIG. 1 taken along lines 3—3 of FIG. 2 showing a tab in an initial position which allows the mounting bracket to be inserted in an opening in a wall panel without interference from the tab;

FIG. 4 is a view similar to FIG. 3 but showing the tab moving rearwardly on the mounting screw;

FIG. 5 is a view similar to FIG. 3 but showing the tab rotating in clockwise direction;

FIG. 6 is a view similar to FIG. 3 but showing the tab advancing back toward the wall panel;

FIG. 7 is a view similar to FIG. 3 but showing the tab in engagement with the wall panel so as to secure the mounting bracket in place.

DETAILED DESCRIPTION

Figure 1:
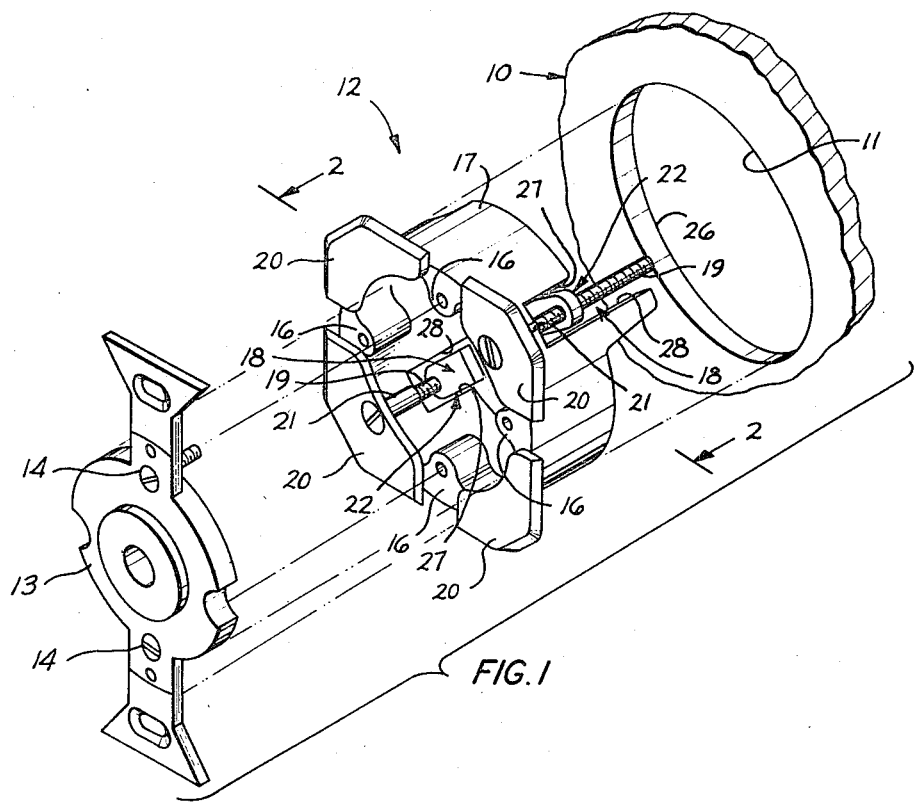
FIG. 1 is an exploded perspective view illustrating a preferred embodiment of an apparatus-mounting bracket of the present invention in combination with an electrical device and a wall opening.

Referring now to FIG. 1 there is shown a wall, designated generally by the numeral 10, having an opening 11 therein for receiving a mounting bracket, designated generally by the numeral 12. The mounting bracket 12 is used to support an apparatus, such as an electrical socket 13, which is secured to a support plate 14. The support plate 14 is attached tot e mounting bracket 12 by a plurality of screws 15—15 which are adapted to be threaded into mounting lugs 16—16 located on the inner surface of a rim 17 of the bracket.

The rim 17 has a pair of slots 18—18 extending therein. The slots 18—18 each having mounting screws 19—19 positioned adjacent thereto. The screws 19—19 extend through openings formed in two of four flanges 20—20 which extend laterally from the forward edge of the rim 17. Intermediate unthreaded portions of the screws 19—19 are mounted in journals 21—21 which have smooth interior surfaces to allow the screws to rotate freely therein so that the screws will not bind or advance in the journals when the screws are turned. Threaded portions of the screws 19—19 extend through and beyond the slots 18—18.

Each of the screws 19—19 has one of a pair of tabs, designated generally by the numerals 22—22, threadedly mounted thereon and disposed to move within the slots 18—18. Each of the tabs 22—22 is divided into a clamping portion 23 and a tracking portion 24. The clamping portions 23—23 of the tabs 22—22 are adapted to engage a rear surface 26 of the wall 10 when the bracket 12 is secured to the wall and within the wall opening 11. The tracking portions 24—24 of the tabs 22—22 are adapted to ride in the slots 18—18 and to thereby prevent the tabs from rotating as they are being advanced either rearwardly or forwardly in the slots.

Figure 2:
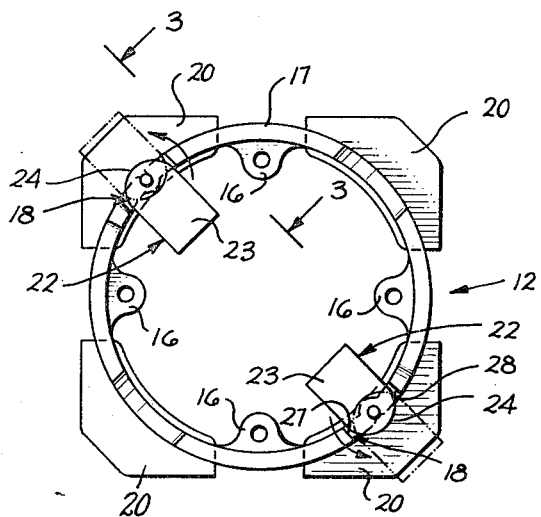
FIG. 2 is a rear view of the bracket of FIG. 1 taken along lines 2—2 thereof.

As best seen in FIG. 1, each of the slots 18—18 has a short edge 27 and long edge 28. As the screws 19—19 are rotated in a counterclockwise direction, the tabs 22—22 advance rearwardly in the slots 18—18 and will eventually clear the short edges 27—27 of the slots after traveling a short distance. Since the tabs 22—22 are rather tightly threaded to the screws 19—19, the tabs will rotate, as illustrated in FIG. 2, with the screws after the tabs clear the edges 27—27 when the screws are rotated in the clockwise direction. However, the tabs 22—22 will rotate only until they engage the long edges 28—28 of the slots 18—18. Upon engaging the edges 28—28 the tabs 22—22 will cease rotating and will advance through the slots 18—18 toward the rear surface 26 of the wall 10 as the screws 19—19 continue to be rotated in the clockwise direction.

It is noted that the tabs 22—22 could be positioned initially adjacent to any portion of the long edges 28—28 with the clamping portions 23—23 of the tabs extending inwardly toward the axis of the rim 17. The mounting bracket 12 can then be inserted into the opening 11 of the wall 10 and the screws 19—19 can be rotated in a clockwise direction to rotate the tabs 22—22 whereafter the tabs will move through the slots 18—18 toward the rear surface 26 of the wall.

Referring now to FIGS. 3 through 7, there are illustrated the sequential movements of one of the tabs 22—22. In FIG. 3, the tab 22 is shown in an initial position with the clamping portion 23 extending within the confines and toward the axis of the rim 17. When in this position, the tab 22 is oriented so as not to interfere with he edge of the wall 10 adjacent the opening 11. Therefore, a person installing the bracket 12 may simply slide the bracket into the opening 11.

In FIG. 4 the tab 22 is shown moving through the associated slot 18 (FIG. 1) and away from the opening 11 of the wall 10 as the associated screw 19 is rotated in a counterclockwise direction. The tab 22 is prevented from rotating because the tracking portion 24 of the tab is retained between successive, spaced, adjacent portions of the edges 27 (FIG. 1) and 28 of the slot 18. When the tab 22 clears the edge 27 (FIG. 1) of the slot 18, it will be free to rotate in the clockwise direction so that, when the screw is rotated in a clockwise direction, the clamping portion 23 can assume the portion as shown in FIG. 6 spaced from and opposite an adjacent portion of the rear surface 26 of the wall 10.

The coefficient of friction of the threadable connection between the screws 19—19 and the tabs 22—22 is high enough so that the tabs will rotate with the screws if not restrained from so doing. As viewed in FIG. 5, one of the tabs 22—22 is shown in an intermediate position as it is being rotated in a clockwise direction with the associated screw 19. The tab 22 will rotate with the screw 19 until the tab engages the edge 28 of the associated slot 18 and assumes the orientation illustrated in FIG. 6. As previously noted, the tabs 22—22 can be located initially in the position as shown in FIG. 6 thereby eliminating the necessity for rotating the associated screws 19—19 in the counterclockwise direction to move the tabs from the position shown in FIG. 3 to the position shown in FIG. 6.

As illustrated in FIG. 6 when the tab 22 engages the extended edge 28 of the slot 18 (FIG. 1) it will no longer be able to rotate in the clockwise direction and will then be moved toward the rear surface 26 of the wall 10 as the screw 19 is rotated in the clockwise direction. The tab 22 will advance in the slot 18 (FIG. 1) until it assumes the position illustrated in FIG. 7. In FIG. 7, the tab 22 is shown with its clamping portion 23 in engagement with the rear surface 26 of the wall 10 to clamp the adjacent portion of the wall between the clamping portion and the associated flange 20 which projects normally from the forward edge of the rim 17. Since there is one tab 22 positioned on each side of the bracket 12, a very rigid assembly is established between the bracket and the wall 10.

It can be readily seen that the bracket 12 can be mounted in the hole 11 of the wall 10 by simply inserting the bracket into the hole and holding the bracket in place with one hand while turning the screws 19—19 by using a screwdriver with the other hand. It is not necessary to hold the tabs 22—22 with one hand while turning the screws 19—19 with the other hand. Mounting the bracket 12, therefore, becomes a rapid, simple, essentially singlehanded operation requiring relatively little manual dexterity.

What is claimed is:

1. In a bracket for supporting an article within an opening in a wall wherein the bracket is of the type secured to a wall by having a flange engage one surface of the wall while having a movable tab engage an oppositely facing second surface of the wall, the improvement comprising:
   a slot formed in the bracket having sides extending generally transverse to the flange wherein one side of said slot is longer than the other and wherein a portion of the tab is selectively received in said slot to prevent substantial rotation of the tab in any direction while permitting reciprocation of the tab toward and away from the flange;
   a relieved portion disposed at the end of the slot opposite the longer side of the slot wherein said relieved portion is larger than the tab for permitting said tab to rotate from an initial position in unopposed relation to the flange to a subsequent position in opposed relation to the flange; and
   a screw mounted rotatably on the bracket and threadably engaging the tab for (1) initially advancing the tab away from the flange and clear of the short side of the slot when the tab is positioned in the initial position and the screw is turned in one direction and for (2) upon turning the screw in the reverse direction, rotating the tab to the subsequent position into engagement with the long side of the slot for subsequent advancement toward the flange to clamp the wall between the tab and flange.

2. The bracket of claim 1 wherein said screw is journaled in said bracket to rotate therein without necessarily advancing longitudinally relative thereto.

3. The bracket of claim 1 wherein the threaded engagement between said tab and said screw has a coefficient of friction which is high enough to rotate said tab with said screw unless restrained from so doing by the sides of said slot.

* * * * *